United States Patent [19]
Santoli

[11] 3,805,231
[45] Apr. 16, 1974

[54] SECURITY LICENSE PLATE FOR VEHICLES

[76] Inventor: Michael Santoli, 6915 Reynolds Rd., Mentor, Ohio 44060

[22] Filed: Aug. 26, 1971

[21] Appl. No.: 175,344

[52] U.S. Cl.................. 340/63, 40/201, 116/33, 180/114, 307/10 AT, 340/64
[51] Int. Cl. ................................. B60r 25/04
[58] Field of Search ............... 340/63, 64; 116/33; 180/114; 307/10 AT; 335/205; 40/201

[56] References Cited
UNITED STATES PATENTS

| | | | |
|---|---|---|---|
| 1,629,959 | 5/1927 | Nelson | 40/201 |
| 3,710,369 | 1/1973 | Takahashi | 335/205 |
| 1,408,059 | 2/1922 | Alkire | 40/201 |
| 1,587,395 | 6/1926 | Martin | 340/64 |
| 1,116,228 | 11/1914 | Bolger | 340/64 |
| 3,657,695 | 4/1972 | Birmingham | 340/52 H |
| 1,297,214 | 3/1919 | Marshall et al. | 340/63 |
| 1,923,310 | 8/1933 | Hippold | 340/64 |
| 1,283,150 | 10/1918 | Gilmore | 116/33 |

FOREIGN PATENTS OR APPLICATIONS 319,752   9/1928   Great Britain ..................... 180/114

*Primary Examiner*—John W. Caldwell
*Assistant Examiner*—Glen R. Swann, III
*Attorney, Agent, or Firm*—Teare, Teare & Sammon

[57] ABSTRACT

A security license plate for use with vehicles has a plate-like body of a predetermined configuration. The body includes a main section and a fragmentary section which together define the predetermined configuration for the body. The main section is arranged for mounting on the vehicle and the fragmentary section is detachable from the main section such that the configuration of the body is recognizably changed to visually indicate an unauthorized use of the vehicle, and wherein the vehicle is of the type having an ignition system, and a switching means is operably connected in the ignition system including an actuating assembly mounted on the fragmentary section to disenable energization of the ignition system upon removal of the fragmentary section from the main section.

7 Claims, 4 Drawing Figures

PATENTED APR 16 1974             3,805,231

INVENTOR
MICHAEL SANTOLI
BY
*Teare, Teare & Sammon*
ATTORNEYS

SECURITY LICENSE PLATE FOR VEHICLES

BACKGROUND OF THE INVENTION

The present invention relates to security devices for vehicles, and more particularly, to security devices adapted for installation in the ignition system of the motor vehicle to effectively prevent unintended starting of the engine thereof, or for installation on those vehicles not including ignition systems to visually or audibly indicate an unauthorized use of such vehicles.

Recently, there have been numerous attempts to provide security devices for preventing the theft of vehicles, such as automobiles, trailers or the like. These devices have taken on various forms with some being completely mechanical in construction, whereas, in other instances, these devices have been adapted for interconnection in the ignition system of a motor vehicle. In any event, these devices have not proven to be entirely satisfactory. For example, those devices which have proven to be extremely reliable have been found to be quite costly to manufacture, whereas, those devices which are inexpensive have not proven to be entirely reliable, and thus, have not provided the desired protection.

Therefore, it has been extremely desirable to provide a security device which can be considered to be sufficiently reliable, as well as, relatively inexpensive so as to be available to all vehicle owners.

SUMMARY OF THE INVENTION

The present invention contemplates on providing a security license plate for vehicles comprising, a plate-like body having a predetermined configuration, such as rectangular or the like, and includes a main body section and a fragmentary body section which together define said predetermined configuration. The main body section is arranged for mounting on the vehicle, and the fragmentary body section is detachable from the main body section for recognizably changing said predetermined configuration so as to visually indicate an unauthorized use of said vehicle. More particularly, the vehicle is of the type having an ignition system, and a switching means is operably connected in the ignition system for enabling energization thereof. The switching means includes an actuating assembly which is mounted for removal with the fragmentary body section so as to disenable energization of the ignition system. The switching means includes a switch assembly which is mounted on the main body section, and the actuating assembly operably coacts with the switching assembly to enable energization of the ignition system when the fragmentary body section is in the mounted position. Further, the body has an identifiable pattern thereon, and the main body section and the fragmentary body section each include a portion of the pattern such that removal of the fragmentary body section from the main body section recognizably changes the pattern to further visually indicate an unauthorized use of the vehicle. Still further, a signal means is operably connected through the switching means being arranged for operable connection in the ignition system, and the switching assembly is arranged to actuate the signal means when the fragmentary body section is removed from the main body section and the ignition system is energized. In addition, the actuating assembly includes a magnetic member and the switching assembly is arranged for actuation by the magnetic field of the magnetic member when the fragmentary body section is in the mounted position. More specifically, the main body section includes a slot extending inwardly from one side thereof, and the fragmentary body section is arranged for slideable positioning within the slot.

DESCRIPTION OF THE PREFERRED EMBODIMENT

Figure 1:
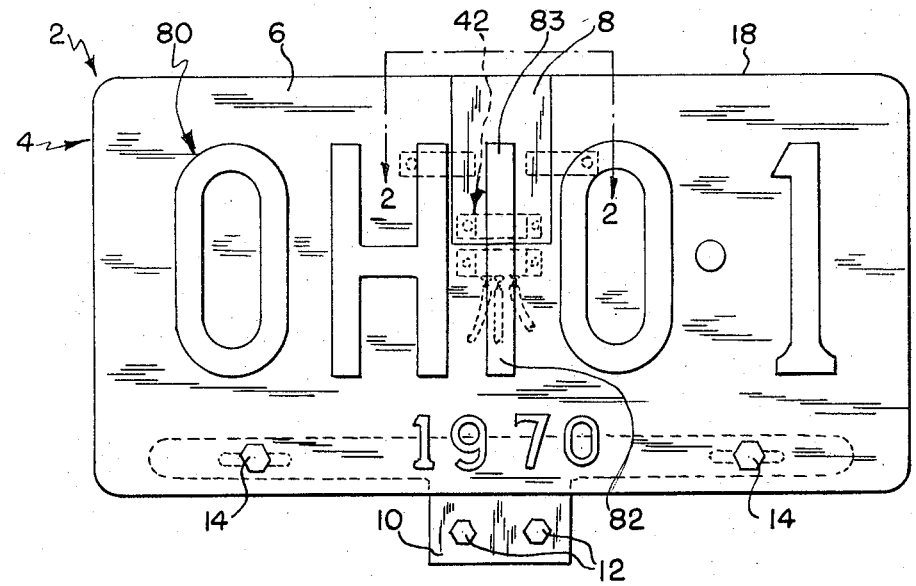
FIG. 1 is a front, elevation view of the security license plate of the present invention.

Referring again to FIG. 1, there is illustrated, generally at 2, the security license plate of the present invention shown as including a body 4 having a main body section 6 and a detachable, insert-like fragmentary body section 8. The main body section 6 is arranged for mounting on the chassis (not shown) of a vehicle, such as an automobile, truck, trailer or the like, such as by a conventional bracket 10 which may be secured to the vehicle chassis by suitable fasteners, as at 12, and in turn, the body 6 may be detachably connected to the bracket 10 by suitable fasteners as at 14.

Figures 2, 3:
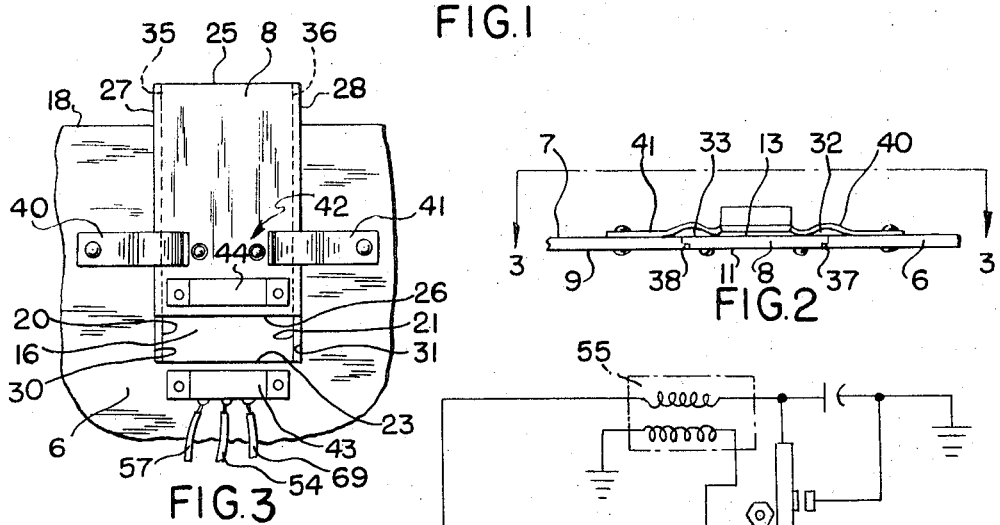
FIG. 2 is a fragmentary, top plan view along the line 2—2 of FIG. 1.
FIG. 3 is a fragmentary, rear elevation view taken along the line 3—3 of FIG. 2.

Referring now to FIG. 2, the body 6 may be of a conventional flat construction having a back face 7 and a front face 9. The body 6 may be of any suitable configuration, such as rectangular (FIG. 1), and may be made of any suitable material, such as plastic, metal or the like as is well known in the art. As shown in FIG. 3, the main body section 6 includes a slot 16 which is shown extending inwardly from one edge, such as the top edge 18, of the body 6. The slot 16 may be of any suitable configuration, and in the form shown is generally rectangular being adapted to receive the fragmentary body section 8 therein. The fragmentary body section 8 is shown in a partially removed position in FIG. 3 and as shown, the slot 16 is defined by generally parallel, opposed marginal side edges, such as at 20 and 21, and an inner marginal edge 23.

As shown in FIGS. 2 and 3, the fragmentary body section 8 is shown as being of a flat construction including front face 11 and back face 13, and is of the same configuration as the slot 16, such as rectangular, defined by a top edge 25, bottom edge 26 and side edges 27 and 28. The side edges 27 and 28 extend generally parallel to one another being adapted for overlapping engagement with the marginal side edges 20 and 21 of the main body section 6 in a manner to be described hereinafter. The top edge 25 and bottom edge 26 extend generally parallel to one another with the bottom edge 26 being adapted for abutting engagement with the inner marginal edge 23 of the main body section 6. In the form shown, the length of the fragmentary body section 8 is substantially equal to the length of the slot 16 such that the upper edge 25 will be disposed in generally aligned relation with the upper edge 18 in the fully inserted position of the fragmentary body section 8 within the slot 16 so as to give the appearance that the fragmentary body section 8 and the main body section 6 are an integral unit when the fragmentary body section 8 is disposed within the slot 16.

Referring again to FIGS. 2 and 3, the main body section 6 is provided with recesses 30 and 31 adjacent the back face 7 which extends along the side marginal edges 20 and 21 defining oppositely disposed projections 32 and 33, respectively. Conversely, the fragmentary body section 8 is provided with recesses 35 and 36 adjacent the opposite side edges 27 and 28 defining projections 37 and 38, respectively, which are adapted for overlapping engagement with the projections 32 and 33 of the main body section 6.

Spring arms 40 and 41 are mounted on the main body section 6 each being attached at one end, such as by rivets, to the main body section 6 having their opposite ends extending inwardly toward one another. The opposite or free ends of the arms 40 and 41 extend inwardly beyond the side marginal edges 20 and 21, respectively, being arranged to project into the slot 16 in the unbiased condition thereof, whereas the arms 40 and 41 are adapted to engage the back face 13 of the fragmentary body section 8 when in the installed position and to apply a pressure to the back face 13 to hold the projections 32 and 33 of the fragmentary body section 8 in abutting engagement with the projections 37 and 38, respectively, of the main body section 6 and enable the fragmentary body section 8 to be slid in and out of the slot 16.

Referring now again to FIG. 1, the body 4 is shown as including a recognizable pattern 80 which may be formed by one or a plurality of symbols, such as letters and/or numbers, which are conventionally used on license plates for identification purposes. In the identification pattern shown in FIG. 1, that is "OHIO.1," the letter "I" includes a lower portion 82 formed on the main body section 6 and an upper portion 83 formed on the fragmentary body section 8. By this arrangement, removal of the fragmentary body section 8 will leave only the lower portion 82 visible to provide a recognizable change in the pattern so as to visually indicate an unauthorized use of the vehicle. It is to be understood, that the fragmentary body section 8 may include any portion of any number and/or letter disposed on the body 4 such that removal thereof will recognizably change the identification pattern 80.

Figure 4:
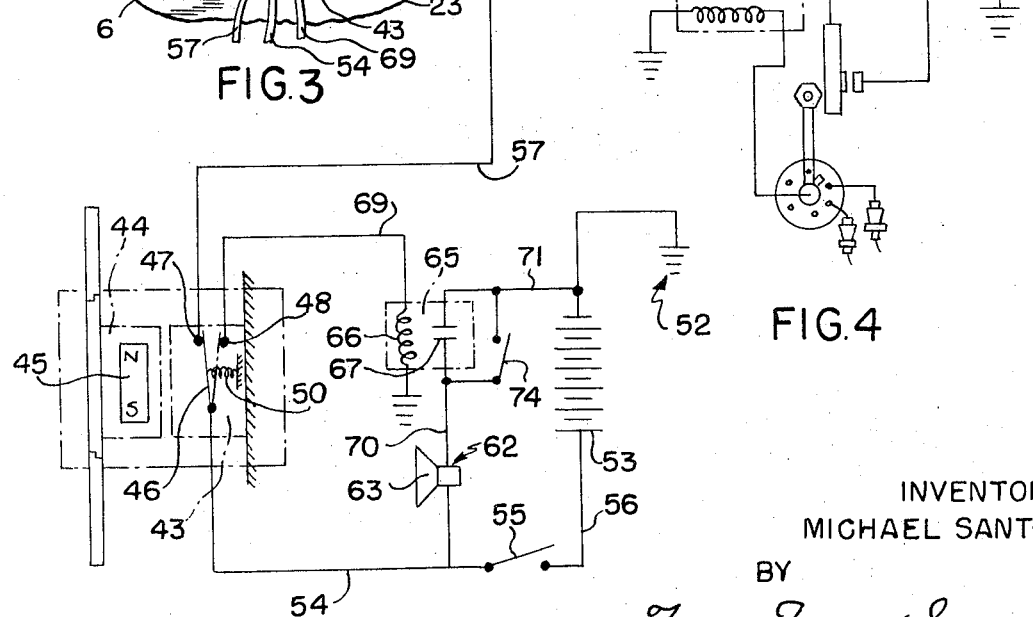
FIG. 4 is a schematic illustration of a typical electrical circuit which may be used for the present invention.

Referring now to FIGS. 1 and 3, a switching device 42 is operably mounted on the body 4 being arranged for interconnection in the ignition system, indicated generally at 52, of an engine of a motor vehicle, such as an automobile or the like, for enabling and disenabling energization thereof when the fragmentary body section 8 is in the installed and removed positions, respectively. As shown in FIG. 3, the switching device 42 includes a switch assembly 43 mounted on the main body section 6 adjacent the inner marginal edge 23 of the slot 16, and an actuating assembly 44 mounted on the fragmentary body section 8 adjacent the bottom edge 26. The switching device 42 may be of the magneticactuated type, such as manufactured by the Alarm Device Manufacturing Company, Inc. of Brooklyn, New York. In such a device, the actuating assembly 44 includes a magnetic member 45 which when moved into close proximity to the switch assembly 43, such as ½ inch or less, it actuates a pivotable contact arm 46. As shown in FIG. 4, the contact arm 46 may be arranged for contact with one contact terminal, such as at 47, in the installed position of the actuating assembly 44 and arranged to be moved into contact with a contact terminal 48, such as by a spring 50 upon removal of the actuating member 44. In the form shown, the switching device 42 is operably connected to the ignition system. The contact arm 46 is electrically connected to the battery 53 of the ignition system 52 via the conductor 54, ignition switch 55 and conductor 56. The contact terminal 47 is shown connected to the ignition coil 55 via the conductor 57. By this arrangement, when the fragmentary body section 8 is in the fully inserted position, and thus, the actuating assembly 44 is disposed in close proximity to the switch assembly 43, the magnetic member 45 will cause the contact arm 46 to move into contact with the contact terminal 47 to apply electrical energy to the ignition coil 55 for starting the engine.

Referring again to FIG. 4, an alarm assembly 62 may be provided to indicate an unauthorized attempt to energize the ignition system 52. The alarm assembly 62 may include a signal device 63, such as the vehicle horn or the like, which is shown connected across the battery 53. The alarm assembly may include a relay assembly 65 having a relay coil 66 and a relay contact 67. The relay coil 66 is shown electrically connected to the contact terminal 48 via the conductor 69 and the relay contact 67 is shown connected between the signal device 63 and the battery 53 via the conductors 70 and 71 and preferably arranged so as to by-pass the conventional horn switch 74. With this arrangement, when the fragmentary body section 8 is removed from the main body section 6, the contact arm 46 will be moved, such as by the spring 50, into engagement with the contact terminal 48 causing the relay coil 66 to be energized. When the relay coil 66 is energized, the contact 67 will close applying electrical energy to the horn when the ignition switch 55 is closed to provide an audible indication of an unauthorized attempt to start the vehicle's engine. It is to be understood that other signal devices, such as a light or the like, may be employed in conjunction with or in lieu of the horn 63 to provide an audible and/or visual indication of such unauthorized attempt to start the vehicle's engine.

I claim:

1. A security license plate for vehicles of the type including an ignition system and having an ignition switch for energizing said ignition system, said license plate comprising, a generally flat, plate-like body having a first predetermined configuration defined by a peripheral edge, said body including a main body section having a second predetermined configuration and arranged for mounting on said vehicle, said main body section including an opening therein, said body including a fragmentary body section having a third configuration conforming to the configuration of said opening in said main body section to enable said fragmentary body section to be inserted into and removed from said opening, said fragmentary body section being mounted on said main body section within said opening to define said first predetermined configuration, said fragmentary body section being selectively detachable from said main body section for removal from within said opening to leave only said main body section and recognizably changing said predetermined configuration by visually displaying said second predetermined configuration, switching means mounted on said body for connection in said ignition system to control energization thereof, said switching means including an actuating assembly mounted for removal with said fragmentary body section to disenable energization of said ignition system, said switching means including a switching assembly mounted on said main body section for actuation by said actuating assembly to enable energization of said ignition system when said fragmentary body section is in the mounted position, said actuating assembly includes a magnet member having a magnetic field, said switching assembly being arranged for actuation by a magnetic field, said switching assembly being disposed in the magnetic field of said magnetic member in the mounted position of said fragmentary body section so as to cause actuation of said switching assembly and enabling energization of said ignition system in the installed position of said fragmentary body section and to disenable energization of said ignition system and visually indicate an unauthorized use of said vehicle in the non-installed position of said fragmentary body section.

2. A security license plate in accordance with claim 1, wherein said body has an identifiable pattern thereon, and said main body section and said fragmentary body section each include a portion of said pattern such that removal of said fragmentary body section from said main body section recognizably changes said pattern to further visually indicate an unauthorized use of said vehicle.

3. A security license plate in accordance with claim 1, including signal means operably connected to said switching means and arranged for operable connection in said ignition system, and said switching assembly bening arranged to actuate said signal means when said fragmentary body section is removed from said main body section and the ignition switch of said ignition system is closed.

4. A security license in accordance with claim 3, wherein said signal means includes an audio-signal producing device.

5. A security license in accordance with claim 1, wherein said main body section includes a peripheral edge, said opening is defined by a slot extending inwardly from one side of said peripheral edge.

6. A security license in accordance with claim 5, wherein said main body section is generally rectangular in configuration including a top edge, said slot is of a generally rectangular configuration and extends inwardly from said top edge being defined by generally parallel, marginal side edges and an inner marginal edge spaced inwardly from the top edge of said main body section, said fragmentary body section is defined by generally parallel side edges engageable with the marginal side edges of said slot, said fragmentary body section is further defined by a bottom edge engageable with said inner marginal edge and a top edge which is aligned with said top edge of said main body section in the inserted position of said fragmentary body section.

7. A security license in accordance with claim 6, wherein said body includes a front surface and a rear surface, said main body section includes opposed flanges extending along said marginal side edges adjacent one of said surfaces, said fragmentary body section including oppositely disposed flanges adjacent the other of said surfaces extending along its side edges defining outwardly projecting to the flanges complementary-shaped flanges adjacent said marginal side edges of said slot for abutting engagement therewith, parallel spring means on said main body section engageable with said fragmentary body section for maintaining said flanges in abutting engagement with one another.

* * * * *